(12) United States Patent
Zornes et al.

(10) Patent No.: US 12,277,531 B2
(45) Date of Patent: Apr. 15, 2025

(54) METHOD AND SYSTEM FOR CLASSIFYING FOOD ITEMS

(71) Applicant: WINNOW SOLUTIONS LIMITED, Milton Keynes (GB)

(72) Inventors: Marc Zornes, London (GB); Kevin Duffy, London (GB); David Woosnam, London (GB); Peter Leonard Krebs, Iowa City, IA (US); Minh-Tri Pham, London (GB); Phong Vo, Birmingham (GB); Mark Haynes, Wandsworth (GB)

(73) Assignee: Winnow Solutions Limited, Milton Keynes (GB)

( * ) Notice: Subject to any disclaimer, the term of this patent is extended or adjusted under 35 U.S.C. 154(b) by 894 days.

(21) Appl. No.: 16/967,966

(22) PCT Filed: Feb. 7, 2019

(86) PCT No.: PCT/GB2019/050338
§ 371 (c)(1),
(2) Date: Aug. 6, 2020

(87) PCT Pub. No.: WO2019/155220
PCT Pub. Date: Aug. 15, 2019

(65) Prior Publication Data
US 2021/0397648 A1 Dec. 23, 2021

(30) Foreign Application Priority Data
Feb. 7, 2018 (GB) .................................. 1802022

(51) Int. Cl.
*G06Q 10/0875* (2023.01)
*G06F 16/55* (2019.01)
*G06F 18/24* (2023.01)
*G06N 20/00* (2019.01)
*G06V 30/194* (2022.01)

(52) U.S. Cl.
CPC .......... *G06Q 10/0875* (2013.01); *G06F 16/55* (2019.01); *G06F 18/24* (2023.01); *G06N 20/00* (2019.01); *G06V 30/194* (2022.01)

(58) Field of Classification Search
CPC ................................................ G06Q 10/0075
USPC ........................................................ 707/738
See application file for complete search history.

(56) References Cited

U.S. PATENT DOCUMENTS

| | | | | |
|---|---|---|---|---|
| 2006/0015289 A1* | 1/2006 | Shakman | ........... | G01G 23/3735 |
| | | | | 702/173 |
| 2015/0170001 A1* | 6/2015 | Rabinovich | ........... | G06F 18/214 |
| | | | | 382/110 |
| 2016/0078414 A1* | 3/2016 | Rathore | ................ | G06F 18/28 |
| | | | | 705/308 |

(Continued)

OTHER PUBLICATIONS

Communication Pursuant to Article 94(3) EPC mailed Jul. 29, 2022 in European Application No. 19 711 651.0, 5 pages.

(Continued)

*Primary Examiner* — Muluemebet Gurmu
(74) *Attorney, Agent, or Firm* — Nixon & Vanderhye, P.C.

(57) ABSTRACT

The present invention relates to a method for classifying food items. The method includes the steps of: capturing one or more sensor data relating to a food item event; and classifying the food item, at least in part, automatically using a model trained on sensor data. A system and software are also disclosed.

28 Claims, 8 Drawing Sheets

(56) References Cited

U.S. PATENT DOCUMENTS

2016/0307072 A1   10/2016  Zhou et al.
2017/0176019 A1*  6/2017  Bhogal .................... A23L 5/17
2017/0220943 A1*  8/2017  Duncan ................... G06N 5/04
2021/0030199 A1*  2/2021  Olson ................. G06Q 20/202

OTHER PUBLICATIONS

Lu, Jie et al., "Transfer Learning Using Computational Intelligence: A Survey," Knowledge-Based Systems, Elsevier, Amsterdam, The Netherlands, vol. 80, Jan. 22, 2015, pp. 14-23, XP029583969, ISSN: 0950-7051, DOI, 10:1016/J.KNOSYS.2015.01.010, 10 pages.
International Search Report for PCT/GB2019/050338 dated May 23, 2019, 4 pages.
Written Opinion of the ISA for PCT/GB2019/050338 dated May 23, 2019, 6 pages.

* cited by examiner

US 12,277,531 B2

METHOD AND SYSTEM FOR CLASSIFYING FOOD ITEMS

This application is the U.S. national phase of International Application No. PCT/GB2019/050338 filed Feb. 7, 2019 which designated the U.S. and claims priority to GB Patent Application No. 1802022.2 filed Feb. 7, 2018, the entire contents of each of which are hereby incorporated by reference.

FIELD OF INVENTION

The present invention is in the field of automated classification. More particularly, but not exclusively, the present invention relates to automated classification of food items.

BACKGROUND

Classification of food items within commercial kitchens has become important in improving efficiency, identifying waste, and reducing cost.

A commercial kitchen has a number of food item events that may occur including removal of various food items from storage, preparation of various food items, serving of various food items and disposal of various food items.

At present, there are few methods to identify and classify food items during those events within a commercial kitchen. Typically a commercial kitchen may utilise a food consultant to identify and classify food items. Obviously, this solution is neither scalable nor sustainable and can only be used infrequently, if at all, for commercial kitchens.

Some systems exist which can assume how good are moving through the system by triangulating purchases, point of sale data, and a regular manual inventory check. In restaurants where a point of sale is used to charge customers on an item level for what is purchased, this can be effective but is flawed due to operational inefficiencies not captured including waste, over/under portioning, and errors in data input either on the receiving side or on the point of sale side. In restaurants that don't use point of sale at an itemised level—for example buffet restaurants, some schools and hospitals—this method does not work leading to very poor controls within the kitchen.

In large production facilities (e.g., airline caterers), more controls may exist at each step including weighing and manually identifying what food is processed at each step. However, this is poorly adopted due to the manual nature of each step.

One solution for classifying food items during disposal events has been developed and deployed by Winnow Solutions Limited. This solution is described within PCT Publication No. WO2015162417. In this solution, the food item that is to be disposed of is placed within a waste receptacle (such as a bin containing earlier disposed food waste), the waste difference is weighed, and a user classifies the type of food item using a hierarchical menu on a touch-screen.

In order to increase speed of classification, it would be desirable if the solution described in WO2015162417 could be automated, at least in part.

It is an object of the present invention to provide a method and system which overcomes the disadvantages of the prior art, or at least provides a useful alternative.

SUMMARY OF INVENTION

According to a first aspect of the invention there is provided a method for classifying food items, including:

Capturing one or more sensor data relating to a food item event; and Classifying the food item, at least in part, automatically using a model trained on sensor data.

According to a further aspect of the invention there is provided a system for classifying food items, including:

One or more sensors configured for capturing sensor data relating to a food item event; and A processor configured for classifying the food item, at least in part, using a model trained on sensor data.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for classifying food items during a food item event.

The inventors have discovered that sensor data relating to a food item event can be captured and a model trained on sensor data can be used to classify the food item using the captured sensor data.

Figure 1:
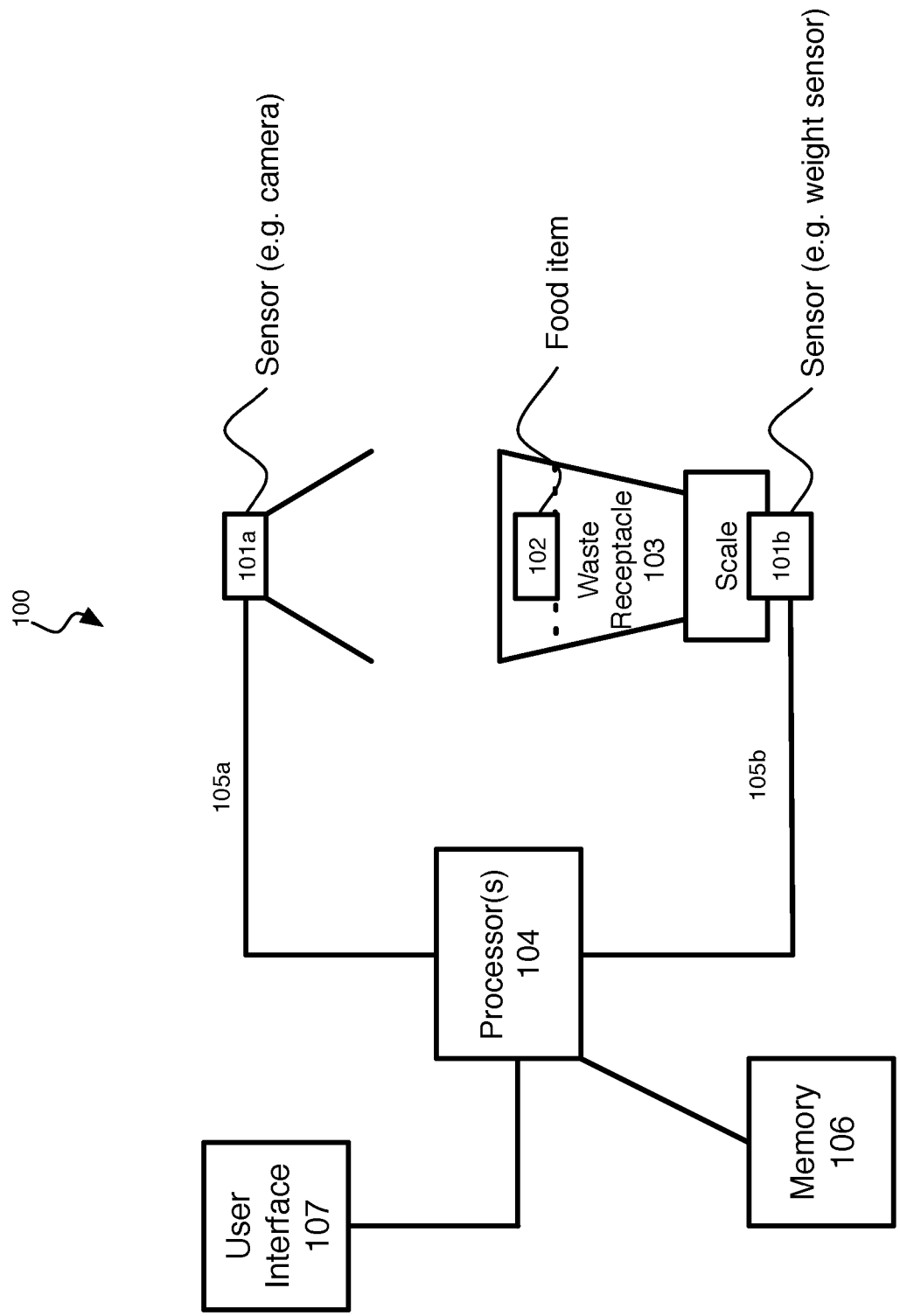
FIG. 1: shows a block diagram illustrating a system in accordance with an embodiment of the invention.

In FIG. 1, a system 100 in accordance with an embodiment of the invention is shown.

The system 100 may include one or more sensors (e.g. 101a, 101b) for receiving sensor data relating to a food item event. The sensors 101a/b may include sensors from the following list of sensor types: 2D camera (e.g. 101a), 3D camera, light field camera, stereo camera, event camera, infrared camera, weight sensor (e.g. 101b), hyper-spectrometry sensor, an "electronic" nose to detect chemicals emitted from food items, and temperature sensor. The sensors 101a/b may include different types of sensors.

The food item event may be, for example, a disposal event. A food item 102 may be placed within a waste receptacle 103, or a waste receptacle 103 containing the food item 102 may be placed in a configuration relative to the sensors 101a/b such that the sensors 101a/b can capture sensor data from the food item 102 during the food item event. It will be appreciated, that in alternative embodiments, the food item event may be removal of the food item 102 from storage (e.g. a fridge, cool store, or pantry), preparation of the food item 102 (e.g. cleaning, chopping, or trimming), cooking of the food item 102, or movement of the food item 102 from one station to another within a commercial kitchen.

The system 100 may include one or more enhancement apparatus for enhancing capture of sensor data by the sensors. For example, the one or more enhancement apparatus may include a light positioned to illuminate food items 102 during a food item event for image capture by an image sensor 101*a*, and/or an ambient light baffle to provide a consistent lighting environment for image capture by an image sensor 101*a*.

The one or more enhancement apparatus may further include a camera calibration board for estimating the camera's intrinsic parameters.

The system 100 may include one or more processors 104 for capturing the sensor data from the sensors 101*a/b*. The sensors 101*a/b* and the processor(s) 104 may be connected via a wired and/or wireless communications system 105*a* and 105*b* (e.g. USB, Ethernet, Bluetooth, Zigbee, WiFi or any other wired or wireless protocol).

The processor(s) 104 may be configured for classifying the food item 102 from the food item event, at least in part, using a model trained on sensor data. The model may be retrieved from a memory 106. In embodiments, the model may be retrieved, at least in part, from a server. The model may be retrieved from the server during the food item event, periodically, or upon a trigger event. For example, the model may be retrieved from the server when an update is specified for the local device.

The model may be trained using sensor data from historical food item events and classification from historical food item events. The historical food item events may be food item events occurring within the local device, the same commercial kitchen, a related set of commercial kitchens, or globally.

The processor(s) 104 may be configured to utilise an inference engine for classifying, at least in part, the food item 102. To classify the food item 102, the inference engine may utilise the model and one or more data selected from the set of duration of food item event, time, date, day of the week, location, previous food item classification, historical food item classifications, patterns of historical food item classifications, and weather.

The system 100 may further include a user interface 107. The interface 107 may include a visual display and a user input. The interface 107 may be a touch-screen or near-touch screen interface. It will be appreciated that in some embodiments, such as where the system is operating in fully automatic mode, the user interface 107 will not be required.

During classification, the processor(s) 104 may be configured to determine using the inference engine and/or model that the food item 102 may be one of a plurality of possible classifications. The number of possible classifications may be determined by a predetermined number (e.g. top ten most likely classifications), determined by possible classifications over a probability threshold (e.g. 90%), or a combination of both (e.g. at least top ten or over 90%). The processor(s) 104 may then display the possible classifications for the food item 102 to a user on the interface 107. The interface 107 may be configured for receiving a user input selecting one of the possible classifications to classify the food item 102. In embodiments, the processor(s) 104 may select the most probable possible classification if the user does not provide a selection within a specified time limit.

In embodiments, the processor(s) 104 may be configured for classifying the food item 102 without user input. However, the interface 107 may be configured for receiving input from a user to override a classification made by the processor(s) 104.

The processor(s) 104, memory 106, interface 107, and/or sensors 101*a/b* may be proximately located and form a local device. The local device may be located within a commercial kitchen.

Figure 2:
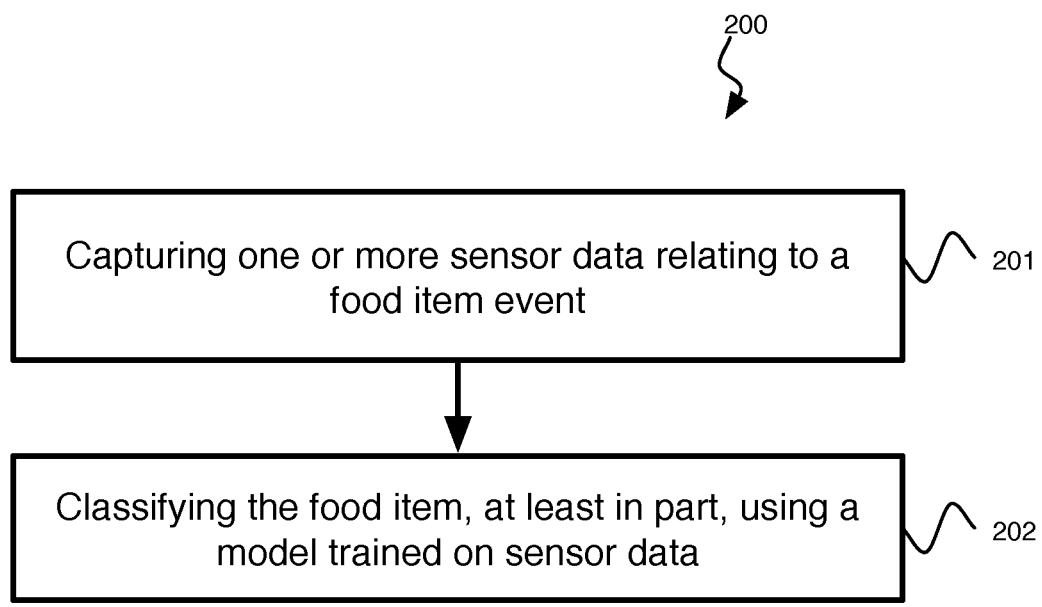
FIG. 2: shows a flow diagram illustrating a method in accordance with an embodiment of the invention.

Referring to FIG. 2, a method 200 for classifying food items will be described.

In step 201, one or more sensor data relating to a food item event is captured.

The sensor data may include sensor data captured over time during the food item event.

The sensor data may include image data such as generated by an image sensor (e.g. 101*a*). For example, the image data may be a 2D picture or pictures captured by a camera. The camera may capture light at least within the visible light spectrum. It will be appreciated that other image data such as 3D image data captured by multiple cameras or a 3D camera, and/or non-visible light such as infrared or ultraviolet light may also be captured by appropriate sensors. The image data may be image data captured over time during the food item event (e.g. a series of still images or a video). The image sensor may capture an image or images of the food item (e.g. 102).

The sensor data may include weight data captured from a weight sensor (e.g. 101*b*) within a scale. The weight sensor may detect, at least, the weight of a food item (e.g. 102) placed directly or indirectly onto the scale. The weight data may be determined by a difference in weight from before the food item event to after the food item event, such that the food item weight itself can be determined.

The weight data may include weight changes during the food item event, such as interim weights over time and final weight.

In embodiments, one or more of the sensor data may be captured continuously or it may be captured only when triggered for a food item event (e.g. upon a weight change at the scale, the image sensor may begin capture).

The food item event may be disposal event. The disposal event may include the food item (e.g. 102) being placed within a waste receptacle (e.g. 103) by a user. The disposal event may be one of a plurality of disposal events relating to same waste receptacle such that food items from multiple events are disposed of consecutively within the waste receptacle without it being emptied.

In embodiments, the food item event may be a commercial kitchen event.

In embodiments, the sensor data may be processed before classification, for example, in order to clean the data or to isolate the food item signal within the sensor data. In one embodiment, where the sensor data includes image data, the image data may be processed to isolate new objects within the images compared to previously captured images (e.g. by comparing a new image frame to an predecessor frame and extracting different pixels; although it will be appreciated that other methods may be utilised). In one embodiment, where the sensor data includes image data, the image data may be processed to detect a waste receptacle (e.g. 103) and the contents of the waste receptacle (e.g. 103) may be isolated for either further processing or classification. In one embodiment, user input may be sought to isolate the food item within the image data, for example, by user-directed cropping or object selection.

The sensor data may be captured from sensors (e.g. 101*a/b*) at a local device. The local device may be within a commercial kitchen. The local device may be a local waste device for receiving disposal events.

In step 202, the food item (e.g. 102) in the event is classified, at least in part, automatically (e.g. via processor(s) 104) using a model trained on sensor data.

The model may be a neural network. Other models which may be used include support vector machines, random forests and gradient boosting models. The model may be trained by using contextual data, captured sensor data relating to historical food item events and/or user classification of food items from those events. Contextual data may be classified into numeric variables, categorical variables, and string variables. All variables may be converted into numeric scalars or vectors, and then provided to the model as additional input data. Numeric variables may be used as-is. Categorical variables may be represented as one-hot vectors or hashed into integers.

String variables may be considered as categorical variables and treated the same way as categorical variables. Contextual data may include client-specific-data, seasonal data, regional data, and public data. Client-specific data may include the locations of the client's sites, the client's menus per site, past daily food consumption data at each site, weight of new food and weight of the waste receptacle. Seasonal data may include weather-related data like temperature, humidity, wind speed and rain level, time-related data like hour, date, day-of-week, month, season, and year. Regional data may include the geolocation of a site, information related to the city and the country where the site locates. Public data may include public food datasets that can be used to increase the model's capacity and performance. The historical food item events may be captured from a plurality of local devices (such as local waste devices deployed within a plurality of commercial kitchens). The user classification may occur at each of those local devices. In embodiments, the user classification may be performed after the historical food item event, for example, by a user reviewing and re-classifying food items by viewing previously captured image data (or other sensor data) for a food item event. In embodiments, the model may be trained by using variations of the sensor data in conjunction with the classification data for the historical food item events. For example, where the sensor data include image data, the model may trained by perturbation of the image data such that the variations of the image data are algorithmically generated to produce transformations such as translations, rotations, reflections, and/or enlargements, and the model is trained using these image data variations.

In embodiments, the food item in the event is classified, at least in part, by the model at a local device also comprising the sensors. In embodiments, the food item is classified, at least in part, at a server. That is, at least some of the sensor data may be transmitted over a communications network to a remotely located server for processing. In embodiments, a decision may be made to classify at the local device or at the remote server (e.g. on the basis of latency, transmission bandwidth, and processing power requirements). It will be appreciated that alternative methods for distributing the classification of the food item is also possible, for example, a set of proximate local devices (either within a commercial kitchen or venue or a related set of kitchens/venues/restaurants) may be processed locally or at a common server.

In one embodiment, the food item is classified, at least in part, by a plurality of models. For example, a first model may be trained using sensor data and classification data obtained from a large training set (e.g. from sensor data and/or classification data obtained from local devices "globally"—that is, at a wide variety of heterogeneous locations within the system), and a second model may be trained using sensor data and classification data from a smaller training set (e.g. from "local" devices or devices with a commonality such as same location, similar style/type of restaurant/kitchen, or branch of a common brand). Classification of the food item may include either weighting the models to determine probabilities for possible classification of a food item (e.g. higher weight to the second "local" model over the first "global" model), classification via the first model with the second model overriding the decision of the first, or classification by the first model with the second model used if a probability threshold fails to be met. The models may additionally return a confidence score on the input data and on each of the output prediction.

The food item may be classified, at least in part, by an interference engine using the model or models. The inference engine may take additional information to aid in the classification process. The inference engine may use historical pattern data (e.g. frequency, popularity or other pattern) in the classification of food items (e.g. at that local device), time, location, immediate historical data (e.g. previous food item events), weather, day of the week, and/or season. The inference engine may also use sensor data directly, for example, weight information for a food item.

In embodiments, a selection of possible classifications for the food item may be determined automatically using the model (e.g. by the inference engine). The possible classifications may be displayed to a user on a user interface and an input may be received from the user to select one of the possible classifications. In one embodiment, if the user does not select an option within a predefined time limit, the possible classification with the highest probability is automatically selected for the food item.

Classification of the food item may include the type of food item (for example, rice, bread, vegetables, roll, cheese cake, meats, fruits, herbs, trimmings, etc), the state of food item (e.g. cooked, uncooked, partially eaten, raw, boiled, fried, stir fried, baked, skinned, etc.), and/or a reason for the food item within the food item event (e.g. trimmings, plate waste). The type of foot item, state of food item, and/or reason for food item within food item event may each comprise multiple features where multiple features are relevant and/or the features may be hierarchically organised (i.e. boiled as a subset of cooked).

Figure 3:
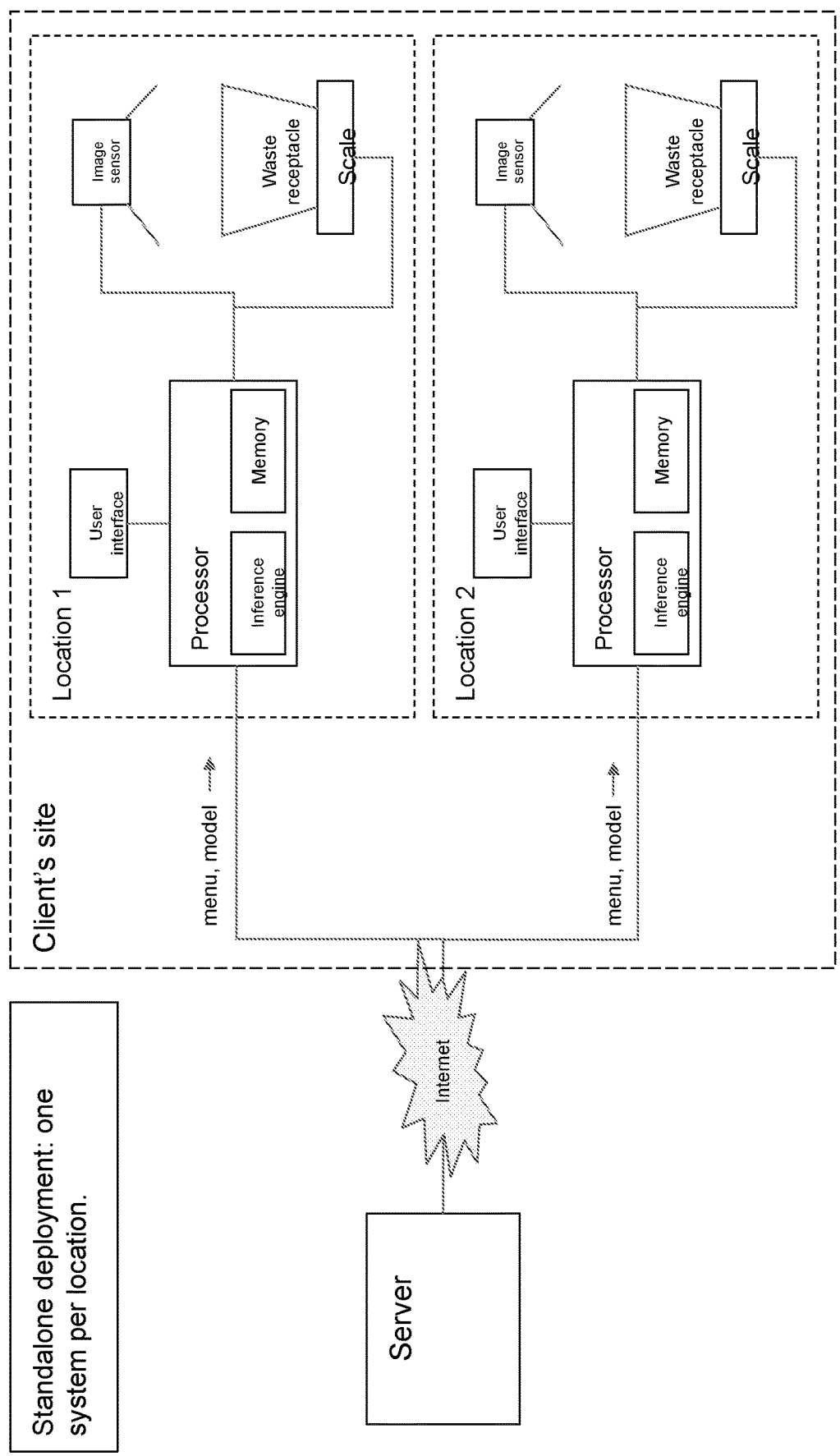
FIG. 3: shows a block diagram illustrating a system in accordance with an embodiment of the invention.
Figure 4:
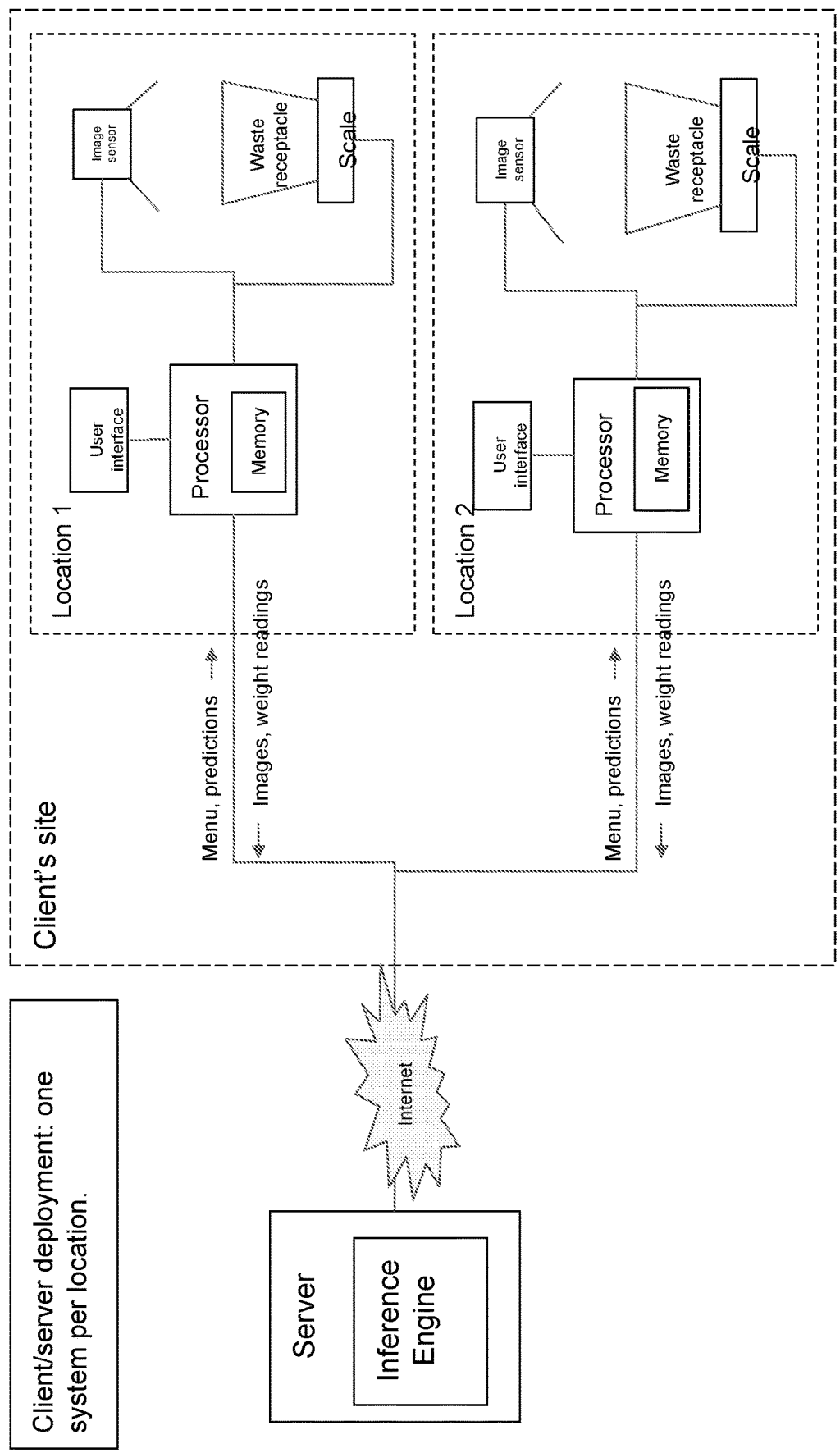
FIG. 4: shows a block diagram illustrating a system in accordance with an embodiment of the invention.
Figure 5:
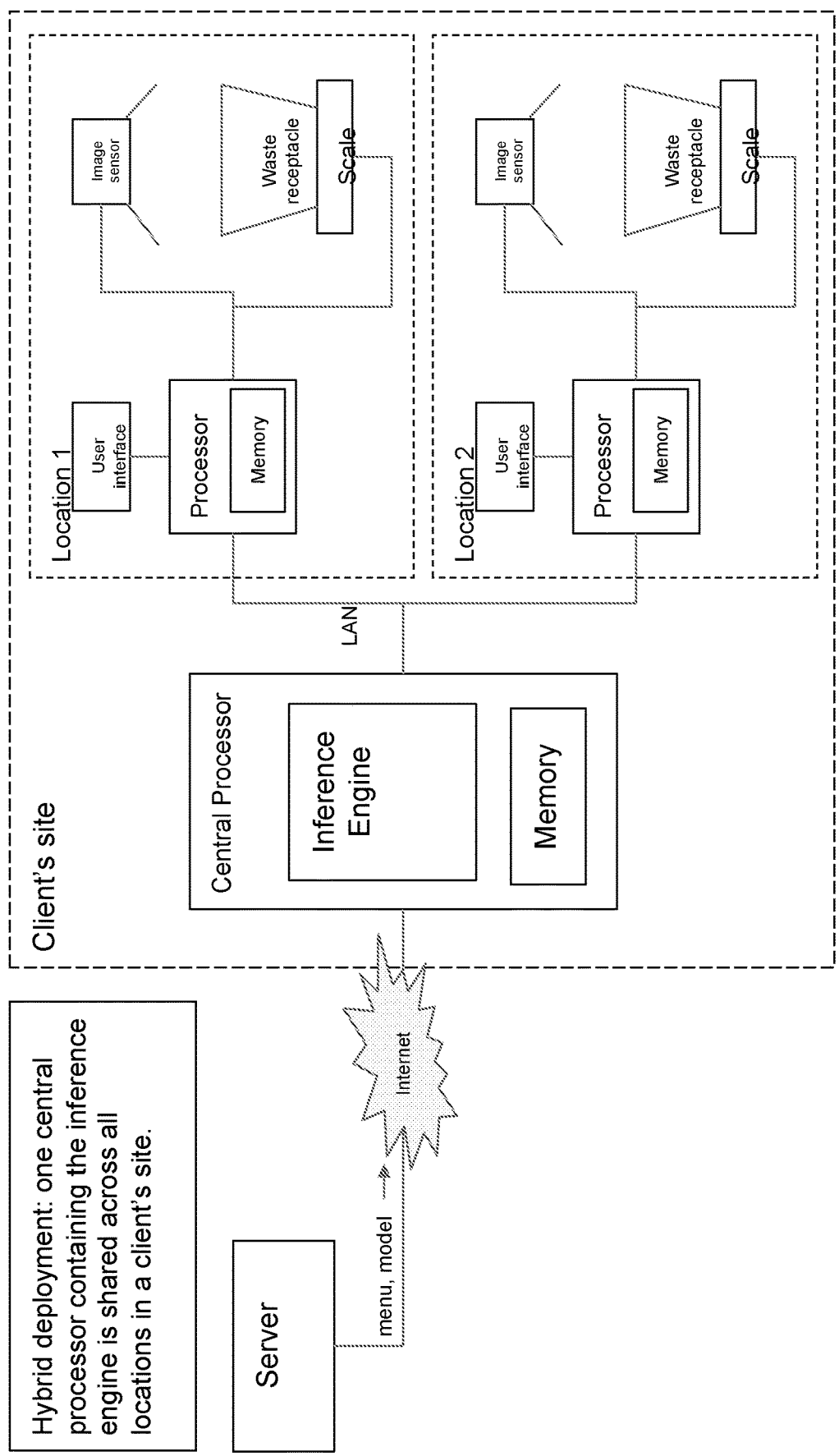
FIG. 5: shows a block diagram illustrating a system in accordance with an embodiment of the invention.

FIGS. 3, 4, and 5 illustrate different deployments of embodiments of the system of the invention. The embodiments are described in relation to disposal events with a waste receptacle, but it will be appreciated that the deployments described are applicable to other food item events.

In FIG. 3, a control server may transmit information such as menu or model to use to a local processor which uses the inference engine locally to classify data from the sensors detecting food item events within the receptacle.

In FIG. 4, a processor at a remote server uses the inference engine to classify data transmitted from sensors detecting food item events within receptacles at multiple locations.

In FIG. 5, a control server may transmit information such as menu or model to use to a processor at a client's site which uses the inference engine to classify data from the sensors detecting food item events within receptacles at multiple locations within the client's site.

Figure 6:
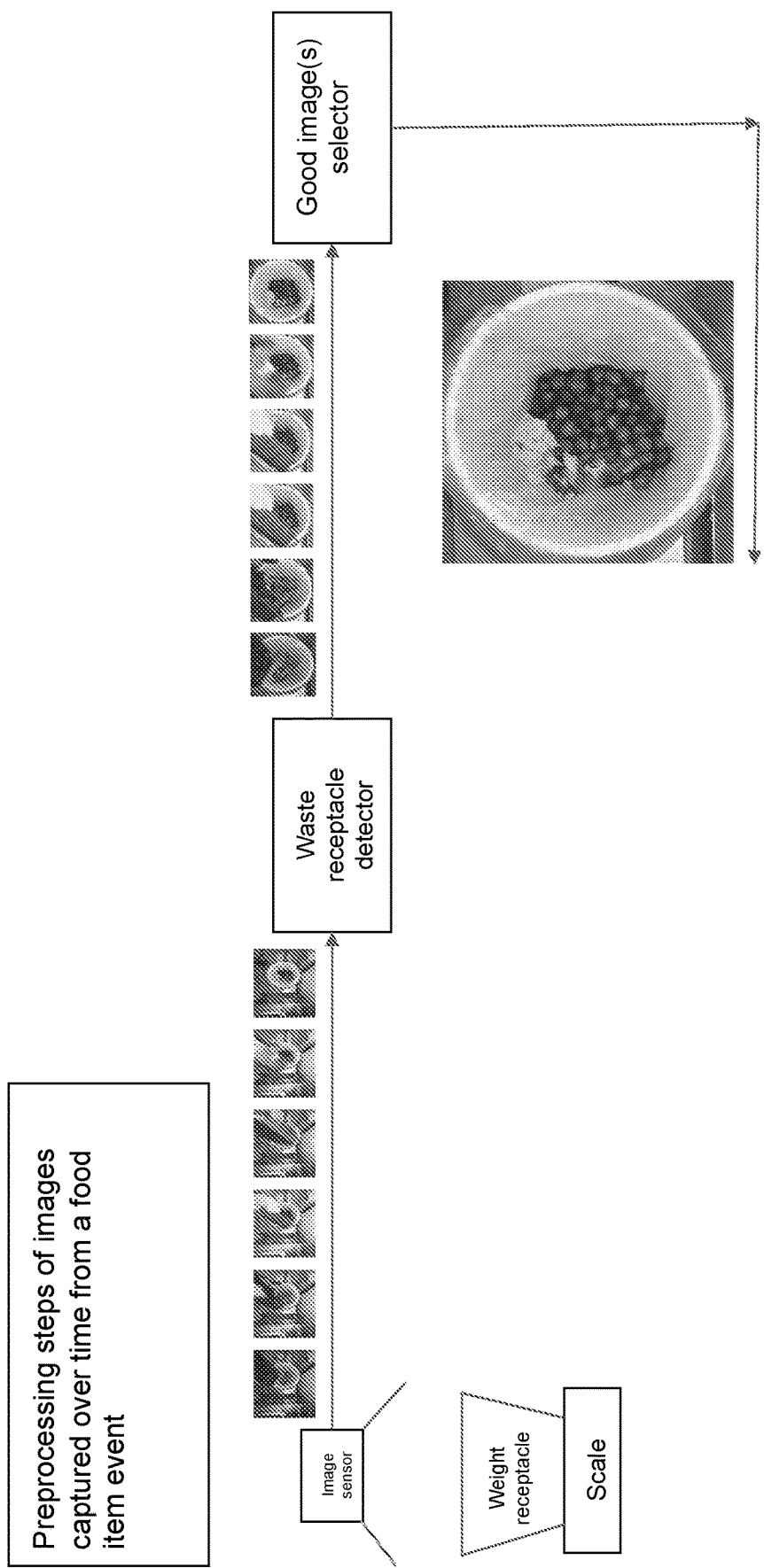
FIG. 6: shows a flow diagram illustrating a method for preprocessing images captured over time in accordance with an embodiment of the invention.

FIG. 6 illustrates a method for pre-processing images captured over time from a food item event to deliver to an analysis engine.

Multiple images are received from the image sensor. Images where the receptacle is detected in the images using a receptacle detection module are then transmitted an good image selection module which selects the best image. A best image may be one where the food item has settled in the receptacle, extraneous items are not visible such as user hands, plates or utensils, and/or one where the image is clear and/or fully illuminated.

Figure 7:
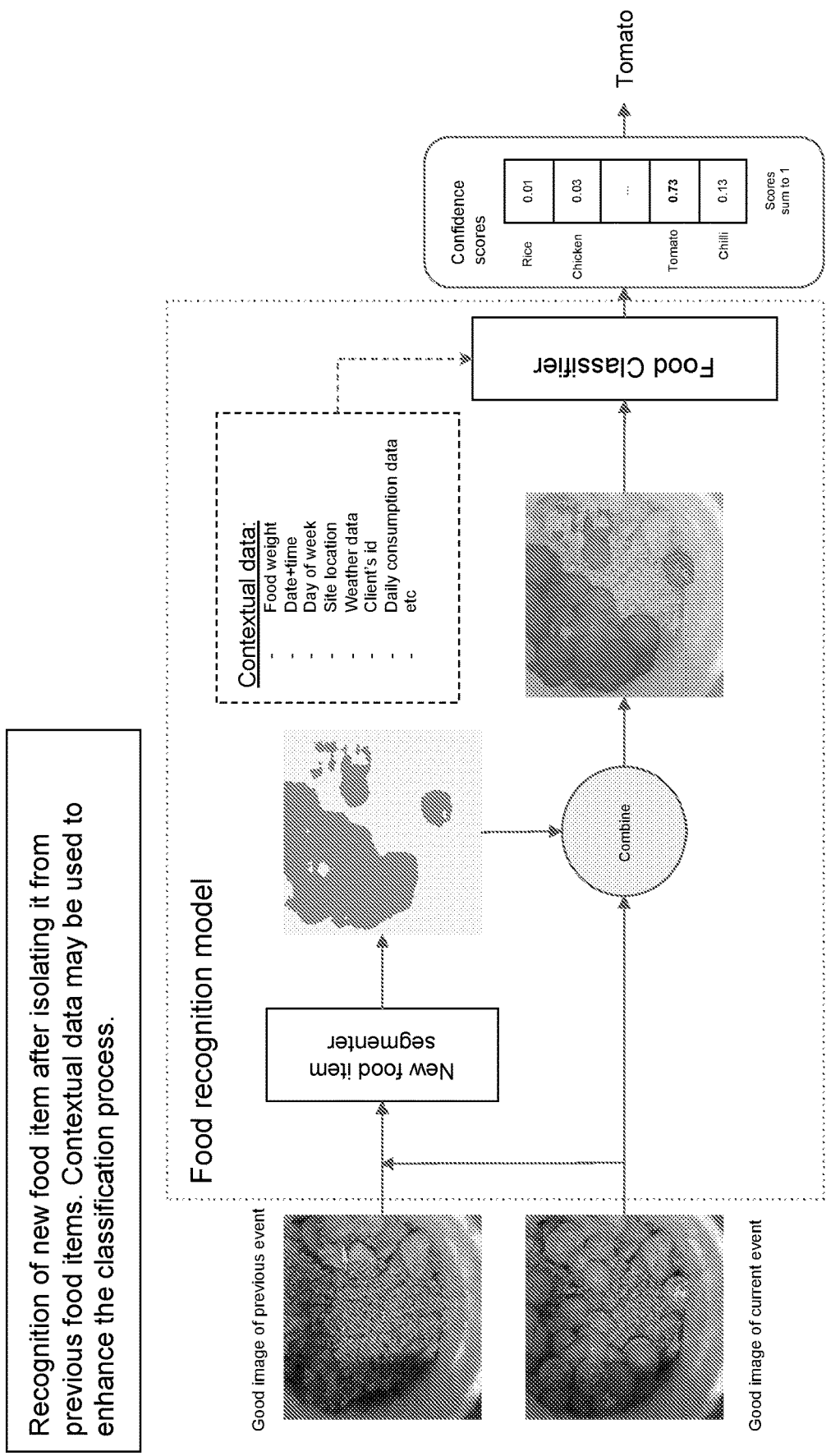
FIG. 7: shows a flow diagram illustrating a method for recognising a new food item within an event in accordance with an embodiment of the invention.

FIG. 7 illustrates a method for recognising or identifying a new food item within an event by isolating it from food items within previous events.

New image data is identified between image of previous event and an image of current event using a segmenter. The image data is extracted from the current image by combination with the segmenter output so that the resultant data can be classified (e.g. also using contextual data).

Figure 8:
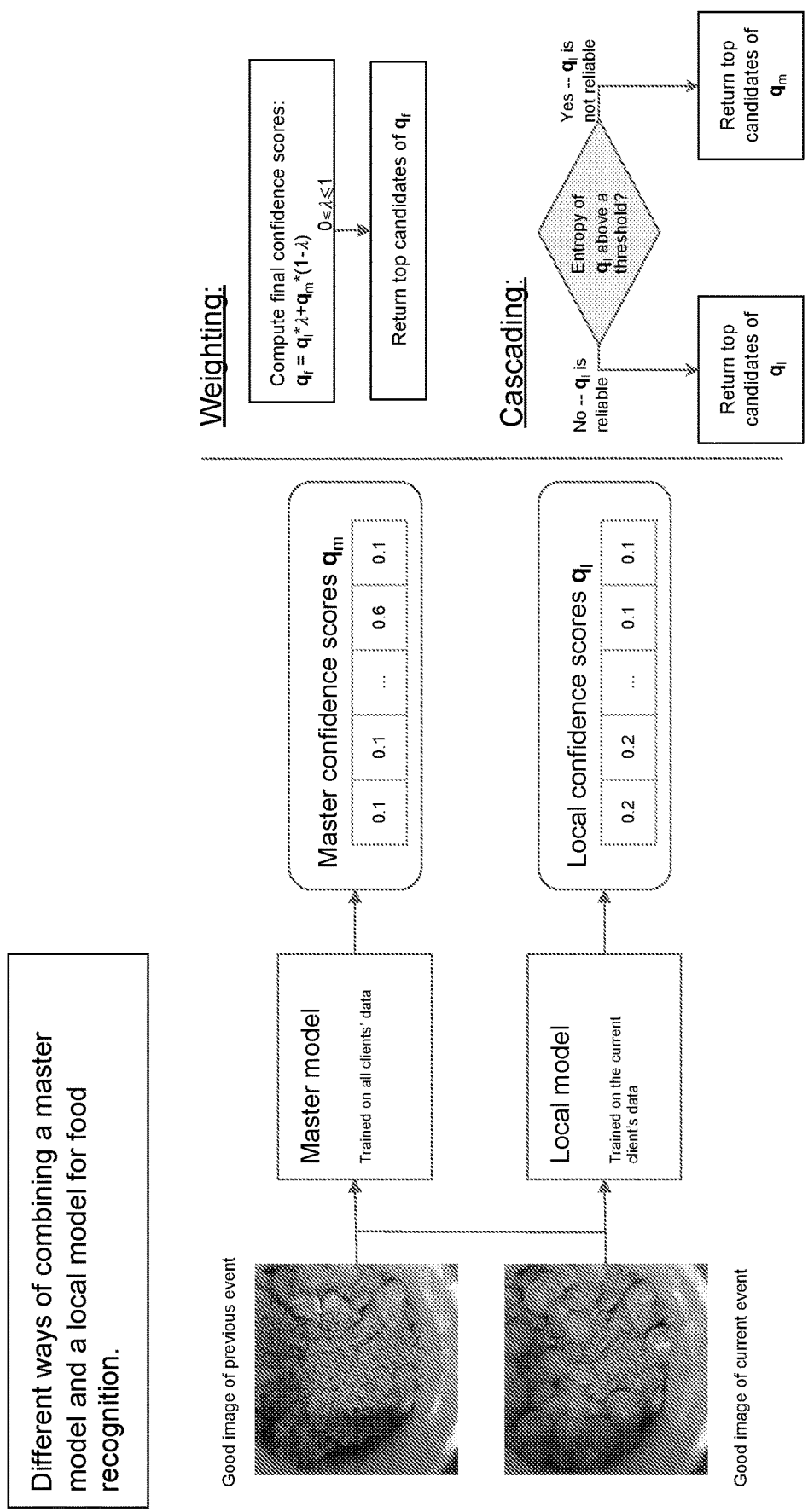
FIG. 8: shows a flow diagram illustrating a method for combining a master model and local model to classify food items in accordance with an embodiment of the invention

FIG. 8 illustrates a method for combining a master model and a local model for food recognition.

For example, in FIG. 8, a master model may be a model (such as a neural network) trained on data obtained from multiple locations from multiple clients (such as specific restaurant chains), and a local model may be a model (such as a neural network) trained on data obtained from locations from one specific client (e.g. only one restaurant or restaurant chain). In this way, recognition can be improved by using a broader knowledge determined from all data and specific knowledge determined from the specific client where this system is deployed. The confidence scores output from the master and local model may be combined using different methods such as via a weighting and/or cascading method.

Potential advantages of some embodiments of the present invention are that classification can be fully automated increasing efficiency and increasing the different areas of a commercial kitchen where food items can be tracked, or that the user classification process can be augmented to reduce user error and/or increase speed of classification.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for classifying food items, including:
capturing one or more sensor data relating to a disposal event, wherein the disposal event includes a food item being placed into a waste receptacle by a user, and the disposal event is one of a plurality of disposal events relating to the waste receptacle such that food items from multiple events are disposed of consecutively within the waste receptacle without the waste receptacle being emptied, wherein the one or more sensor data includes image data captured from an image sensor above the waste receptacle and wherein the image data includes image data captured while the food item is being placed within the waste receptacle or after the food item has been placed within the waste receptacle onto food items within one or more previous disposal events, and wherein the one or more sensor data includes weight data;
processing the image data to isolate new objects within the image data compared to previously captured image data using a segmenter; and
classifying the food item using at least the processed image data, at least in part, automatically using a model trained on sensor data, and using the weight data.

2. The method as claimed in claim 1, wherein the image data is processed by a method including the step of: identifying new image data between an image of a previous disposal event and an image of the disposal event using the segmenter such that the food item is isolated from food items in previous disposal events.

3. The method as claimed in claim 2, wherein the image data is processed by a method including the step of: combining the identified new image data with the image of the disposal event to result in a combined data;
wherein the food item is classified using at least the combined data.

4. The method as claimed in claim 2, wherein the image data is compared to earlier image data captured before the disposal event, and a difference between the two image data is used to classify the food item.

5. The method as claimed in claim 2, wherein the image sensor is a visible light camera.

6. The method as claimed in claim 2, further including detecting a waste receptacle within the image data to isolate potential food items.

7. The method as claimed in claim 2, wherein the image data includes a plurality of concurrently captured images of the food item captured over time during the plurality of disposal events and wherein the food item is classified using an image selected from the plurality of images using a good image selection module.

8. The method as claimed in claim 1, wherein the model is a neural network.

9. The method as claimed in claim 1, wherein the food item is classified, at least in part, by an inference engine using the model.

10. The method as claimed in claim 9, wherein the inference engine also uses historical pattern data to classify the food item.

11. The method as claimed in claim 10, wherein the inference engine also uses one or more selected from the set of time, location, and immediate historical data to classify the food item.

12. The method as claimed in claim 10, wherein the inference engine determines a plurality of possible classifications for the food items.

13. The method as claimed in claim 12, wherein a number of possible classifications is based upon a probability for each possible classification exceeding a threshold.

14. The method as claimed in claim 12, wherein the plurality of possible classifications is displayed to a user on a user interface.

15. The method as claimed in claim 14, wherein an input is received by the user to classify the food item.

16. The method as claimed in claim 12, wherein the inference engine classifies the food item in accordance with the possible classification with the highest probability.

17. The method as claimed in claim 1, wherein the model is trained by capturing sensor data relating to historical food item events and users classifying the food items during the historical food item events.

18. The method as claimed in claim 17, wherein the sensor data relating to historical food item events are captured and the users classify the food items during the historical food item events at a plurality of local food waste devices.

19. The method as claimed in claim 1, wherein the sensor data is captured at a local device within a commercial kitchen and the disposal event is a commercial kitchen event.

20. The method as claimed in claim 19, wherein a dynamic decision is made to classify the food item at the local device or a server.

21. The method as claimed in claim 1, wherein weight data is captured from a weight sensor.

22. The method as claimed in claim 1, wherein the food item is classified, at least in part, automatically using a plurality of models trained on sensor data.

23. The method as claimed in claim 22, wherein a first model of the plurality of models is trained on sensor data from global food item events.

24. The method as claimed in claim 23, wherein a second model of the plurality of models is trained on sensor data from local food item events.

25. The method as claimed in claim 1, wherein the sensor data includes sensor data captured over, at least part, a duration of the plurality of disposal events.

26. A system for classifying food items, including:
one or more sensors configured for capturing one or more sensor data relating to a disposal event, wherein the disposal event includes a food item being placed into a waste receptacle by a user, and the disposal event is one of a plurality of disposal events relating to the waste receptacle such that food items from multiple events are disposed of consecutively within the waste receptacle without the waste receptacle being emptied, wherein the one or more sensor data includes image data captured from an image sensor above the waste receptacle and wherein the image data includes image data captured while the food item is being placed within the waste receptacle or after the food item has been placed within the waste receptacle onto food items within one or more previous disposal events, and wherein the one or more sensor data includes weight data; and
at least one processor configured for processing the image data to isolate new objects within the image data compared to previously captured image data using a segmenter and for classifying the food item using at least the processed image data, at least in part, using a model trained on sensor data, and using the weight data.

27. Non-transitory computer-readable medium configured for storing a computer program which when executed on at least one processor performs the steps of:
capturing one or more sensor data relating to a disposal event, wherein the disposal event includes a food item being placed into a waste receptacle by a user, and the disposal event is one of a plurality of disposal events relating to the waste receptacle such that food items from multiple events are disposed of consecutively within the waste receptacle without the waste receptacle being emptied, wherein the one or more sensor data includes image data captured from an image sensor above the waste receptacle and wherein the image data includes image data captured while the food item is being placed within the waste receptacle or after the food item has been placed within the waste receptacle onto food items within one or more previous disposal events, and wherein the one or more sensor data includes weight data;
processing the image data to isolate new objects within the image data compared to previously captured image data using a segmenter; and
classifying the food item using at least the processed image data, at least in part, automatically using a model trained on sensor data, and using the weight data.

28. The method as claimed in claim 1, wherein the food item of at least some of the disposal events is an aggregate food waste item.

* * * * *